(12) United States Patent
Daniel (10) Patent No.: US 9,594,461 B1
(45) Date of Patent: Mar. 14, 2017

(54) APPARATUS AND METHOD OF HOSTING OR ACCEPTING HOLOGRAM IMAGES AND TRANSFERRING THE SAME THROUGH A HOLOGRAPHIC OR 3-D CAMERA PROJECTING IN THE AIR FROM A FLAT SURFACE

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 320 days.

(21) Appl. No.: 14/298,681

(22) Filed: Jun. 6, 2014

Related U.S. Application Data (60) Provisional application No. 61/831,953, filed on Jun. 6, 2013.

(51) Int. Cl.
| | |
|---|---|
| *G03B 21/58* | (2014.01) |
| *G06F 3/042* | (2006.01) |
| *G03H 1/22* | (2006.01) |
| *G02B 27/00* | (2006.01) |
| *G06F 3/01* | (2006.01) |
| *G03B 21/10* | (2006.01) |
| *G03H 1/00* | (2006.01) |

(52) U.S. Cl.
CPC ....... *G06F 3/0421* (2013.01); *G02B 27/0093* (2013.01); *G03B 21/10* (2013.01); *G03B 21/58* (2013.01); *G03H 1/2202* (2013.01); *G06F 3/017* (2013.01); *G03H 2001/0088* (2013.01); *G03H 2226/02* (2013.01)

(58) Field of Classification Search
CPC ............. G02B 27/0103; G02B 27/225; G02B 27/0127; G03B 21/10; G03B 21/58; G03B 21/145; G03B 21/585
See application file for complete search history.

(56) References Cited

U.S. PATENT DOCUMENTS

| | | | | |
|---|---|---|---|---|
| 9,022,581 | B2 * | 5/2015 | Hirata | G02B 17/08 353/98 |
| 2010/0128228 | A1 * | 5/2010 | Matsuo | G03B 21/13 353/34 |
| 2011/0032482 | A1 * | 2/2011 | Agurok | G02B 27/0075 353/7 |
| 2012/0257795 | A1 * | 10/2012 | Kim | H04N 13/0022 382/106 |
| 2012/0268372 | A1 * | 10/2012 | Park | G06F 3/017 345/158 |
| 2013/0050807 | A1 * | 2/2013 | Lee | G02B 26/005 359/316 |

* cited by examiner

*Primary Examiner* — Sultan Chowdhury
(74) *Attorney, Agent, or Firm* — Carol N. Green Kaul, Esq.

(57) ABSTRACT

An apparatus, method and computer readable media for hosting, controlling, displaying, manipulating and/or transferring hologram(s) or holographic image(s), videos and/or multimedia data. The invention contemplates the use of a number of components, including without limitation, a retractable flexible screen, projector(s), processor(s), memory and also contemplates computer readable media for code necessary for the implementation of invention's embodiments.

28 Claims, 7 Drawing Sheets

APPARATUS AND METHOD OF HOSTING OR ACCEPTING HOLOGRAM IMAGES AND TRANSFERRING THE SAME THROUGH A HOLOGRAPHIC OR 3-D CAMERA PROJECTING IN THE AIR FROM A FLAT SURFACE

CROSS REFERENCE TO RELATED APPLICATIONS

This application claims the benefit of, and is related to U.S. provisional patent application filed on Jun. 6, 2013 with Ser. No. 61/831,953, titled "Apparatus And Method Of Hosting Or Accepting Hologram Images And Transferring The Same Through A Holographic Or 4-D Camera Projecting In The Air From A Flat Surface" and incorporated in its entirety herein.

FIELD OF THE INVENTION

This specification relates to a device capable of resourcefully handling, hosting, displaying and/or controlling a plurality of hologram images, video and/or multimedia data passing through its operating systems and releasing the same in real-time.

BACKGROUND OF THE INVENTION

This invention relates to a method for hosting and passing already made hologram images or videos and an apparatus for transferring or displaying the same, which may be displayed by any means such as head-up display or mounted on an sports helmet serving as a sportsman visor, SWAT team head cover, soldiers or special team forces' gear, at the theater as a flat surface or head up display at any given time, but not exclusively for the above mentioned devices or platforms but also for everyday home devices/platforms.

For a further and more fully detailed understanding of the present invention, various objects and advantages thereof, reference is made to the following detailed description and the accompanying drawings. Additional objectives of the present invention will appear as the description proceeds.

The foregoing and other objects and advantages will appear from the following description. References are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

SUMMARY OF THE INVENTION

It is an objective of the present invention to provide an apparatus, methods and computer readable media for hosting, controlling, displaying, interacting, manipulating hologram(s) or holographic image(s), videos and/or multimedia data/products in real time and an apparatus for transferring or displaying the same, which may be displayed by any means including, without limitation, head-up displays.

An aspect of an embodiment of the present invention features an apparatus for displaying hologram(s) or holographic image(s), which may include: one or more projectors disposed within the apparatus, where the projector(s) may be configured to project hologram(s) or holographic image(s), a flexible screen disposed within the apparatus, a processor disposed within the apparatus, where the processor may be in communication with memory also disposed within the apparatus and where the processor may be configured to process the hologram(s) or holographic image(s), one or more depth sensors disposed within the apparatus and in communication with the processor, where one or more depth sensor may be configured to detect a user's hands and gestures (in another aspect, the depth sensor(s) may be enabled and/or configured to recognize the physical interaction from a user's hands and also the interaction between the user's hands and the hologram(s) or holographic image(s)), a release button located on the apparatus, and a release and retract mechanism, disposed within the apparatus and in communication with the release button. The mechanism releases and retracts the flexible screen upon activation of the release button. The processor and the depth sensor(s) may, in another aspect, collaborate to reflect manipulations and/or interactions made to the hologram(s) or holographic image(s) by the user. This may be made possible by the processing of data (by the processor) sensed, collected and/or observed by the depth sensor(s).

In one aspect of an embodiment of the present invention, the apparatus may be enabled to communicate with one or more secondary devices such as a mobile phone, 3-dimensional glasses or the like. In another aspect, the apparatus may be remotely controlled by the one or more secondary devices.

In one aspect of an embodiment of the present invention, the projector(s) may be configured to project air or vapor. In one aspect, the air or vapor may contain reflective particles. This thin sheet of air or vapor may enable the display of a hologram(s) or holographic image(s) within it. The reflective particles, in one aspect, make it possible for the h hologram(s) or holographic image(s) to be displayed in higher resolution. In another aspect, the hologram(s) or holographic image(s) may be controlled by way of this projected layer of air/vapor, with controls being projected within it and the hologram generator device being enabled to receive those controls.

In another aspect of an embodiment of the present invention, the hologram generating device may include a curved slit that emits a thin sheet of air or vapor with special reflective properties. This unique layer of vapor provides the custom medium for aggregate light from an array of projector(s)s rendering a three dimensional (3-D) scene to be reflected towards the user and essentially produces a 3-D hologram. In addition, the custom medium may be curved to enhance the field of view over that of a flat surface.

In one aspect of an embodiment of the present invention, the apparatus may include one or more visual trackers, which, in one aspect, may be disposed in communication with the processor. The visual tracker(s) may be enabled and/or configured to track a user's interaction with the hologram or holographic image. In one aspect, the visual tracker(s) may include of one or more lasers, where the laser(s) may be configured to track a user's hands as he or she manipulates or interacts with the hologram or holographic image. The visual tracker(s) may be used, in another aspect, where the hologram generating device is used as a peripheral unit as opposed to a self-contained unit. The visual tracker(s) may also be configured to detect manipulation of content within the hologram(s) or holographic image(s). The processor and the tracker(s) may, in another aspect, collaborate to reflect manipulations and/or interactions made to the hologram(s) or holographic image(s) by the user.

In one aspect of an embodiment of the present invention, the visual tracker(s) may be used where the hologram generating device relies on a secondary viewing device. In this case, the visual tracker(s) pattern may be embedded into the material itself. The unique design of the pattern provides the visual tracking mechanism and may use a combination of pattern recognition and feature tracking software. In one aspect, these may run on secondary devices such as, without limitation, a wearable device, smartphone, etc., to provide the data used to build an accurate 3-D coordinate system with the hologram generating device at the center. In another aspect, augmented reality may use the visual tracker(s) to help position virtual objects in a 3-D space. If the hologram generating device is being used as a peripheral device, then a custom designed pattern that serves as a visual tracker may be placed around the device.

In another aspect of an embodiment of the present invention, the processor may be configured to enable manipulation of content within the hologram or holographic image. In another aspect of an embodiment of the present invention, the processor and the depth sensor(s) collaborate to reflect manipulations and interactions made to the hologram or holographic image by the user. This may be made possible by the processing data (by the processor) collected or observed by the depth sensor(s).

In another aspect of an embodiment of the present invention, the processor and the tracker(s) collaborate to reflect manipulations and interactions made to the hologram or holographic image by the user. This may be made possible by the processing of data (by the processor) sensed, collected and/or observed by the tracker(s).

In another aspect of an embodiment of the present invention, an aspect may feature non-transitory computer program product on or having computer readable medium having control logic stored on it for causing a processor to enable the display of the hologram(s) or holographic image(s)s, the control logic may include: computer readable code for receiving information required for the generation of the hologram(s) or holographic image(s), computer readable code for processing information required for generation of the hologram(s) or holographic image(s), computer readable code for determining which hologram(s) or holographic image(s) to project, computer readable code for enabling the projection of the hologram(s) or holographic image(s), and computer readable code for enabling manipulation of the hologram(s) or holographic image(s).

In another aspect of an embodiment of the present invention, the computer readable medium may further include computer readable code for enabling the manipulation of content within the hologram(s) or holographic image(s).

In another aspect of an embodiment of the present invention, the computer readable medium may further include computer readable code for enabling control of said at least one holographic image from an air display. In one aspect, this may be made possible by the collaboration between the processor, the layer of air/vapor projected by the projector(s), the depth sensor(s) and/or the visual tracker(s), and the processing of information/data obtained by all or some of these components of the hologram generator device.

In yet another aspect of an embodiment of the present invention, the computer readable medium may further include computer readable code for transforming the hologram(s) or holographic image(s).

In yet another aspect of an embodiment of the present invention, the computer readable medium may further include computer readable code for enabling real-time projection of the hologram(s) or holographic image(s).

In yet another aspect of an embodiment of the present invention, the computer readable medium may further include computer readable code for determining coordinates for the hologram(s) or holographic image(s).

In yet another aspect of an embodiment of the present invention, the computer readable medium may further include computer readable code for displaying a 3-dimensional hologram.

In yet another aspect of an embodiment of the present invention, the computer readable medium may further include computer readable code for coordinating sensed hand interactivity with the hologram(s) or holographic image(s) and displaying manipulations of the hologram(s) or holographic image(s) as a result of the sensed hand interactivity.

In yet another aspect of an embodiment of the present invention, the computer readable medium may further include computer readable code for enabling the tracking of a user's hand motion.

In yet another aspect of an embodiment of the present invention, the computer readable medium may further include computer readable code for enabling maintenance of color and background of the hologram(s) or holographic image(s).

In yet another aspect of an embodiment of the present invention, the computer readable medium may further include computer readable code for enabling communication of the processor with the secondary device(s).

An further aspect of an embodiment of the present invention features method(s) of enabling a processor to display one or more holographic image(s), video and/or multimedia data, the method(s) may include the steps of: determining which one or more holographic image(s), video and/or multimedia data to project; receiving information required for generation of one or more holographic image(s), video and/or multimedia data; processing information required for generation of one or more holographic image(s), video and/or multimedia data; enabling projection of one or more holographic image(s), video and/or multimedia data; controlling the one or more holographic image(s) from an air display; and enabling manipulation of one or more holographic image(s), video and/or multimedia data.

In yet a further aspect of an embodiment of the present invention, the method may include the step of enabling manipulation of content within one or more holographic image(s), video and/or multimedia data.

In yet a further aspect of an embodiment of the present invention, the method may include the step of enabling real-time projection of one or more holographic image(s), video and/or multimedia data.

In yet a further aspect of an embodiment of the present invention, the method may include the step of displaying a 3-dimensional holographic image(s), video and/or multimedia data.

In yet a further aspect of an embodiment of the present invention, the method may include the step of coordinating sensed hand interactivity with one or more holographic image(s), video and/or multimedia data and displaying manipulations of one or more holographic image(s), video and/or multimedia data as a result of the sensed hand interactivity.

In yet a further aspect of an embodiment of the present invention, the method may include the step of enabling tracking hand motion of a user.

In yet a further aspect of an embodiment of the present invention, the method may include the step of enabling maintenance of color and background of one or more holographic image(s), video and/or multimedia data.

In yet a further aspect of an embodiment of the present invention, the method may include the step of enabling communication of the processor with at least one secondary device.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Figure 1A:
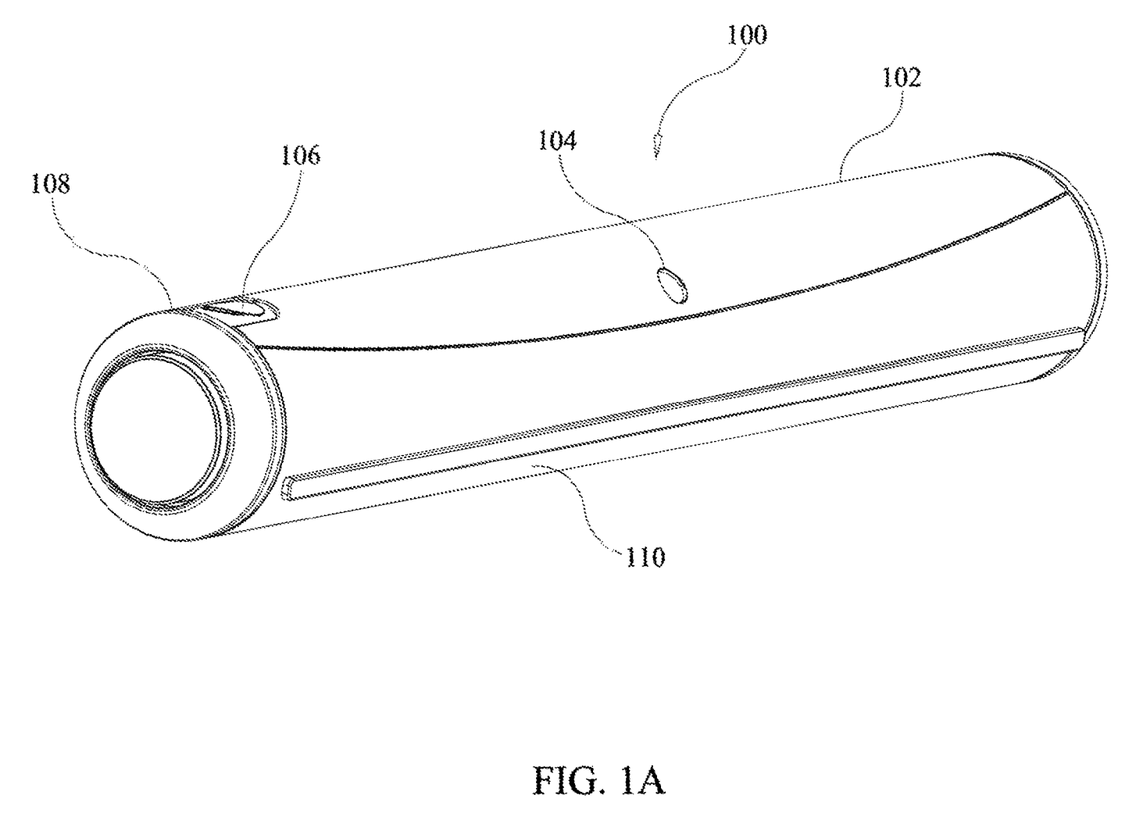
FIGS. 1A & 1B show perspective views of the hologram generator device according to aspects of embodiments of the present invention.
Figure 1B:
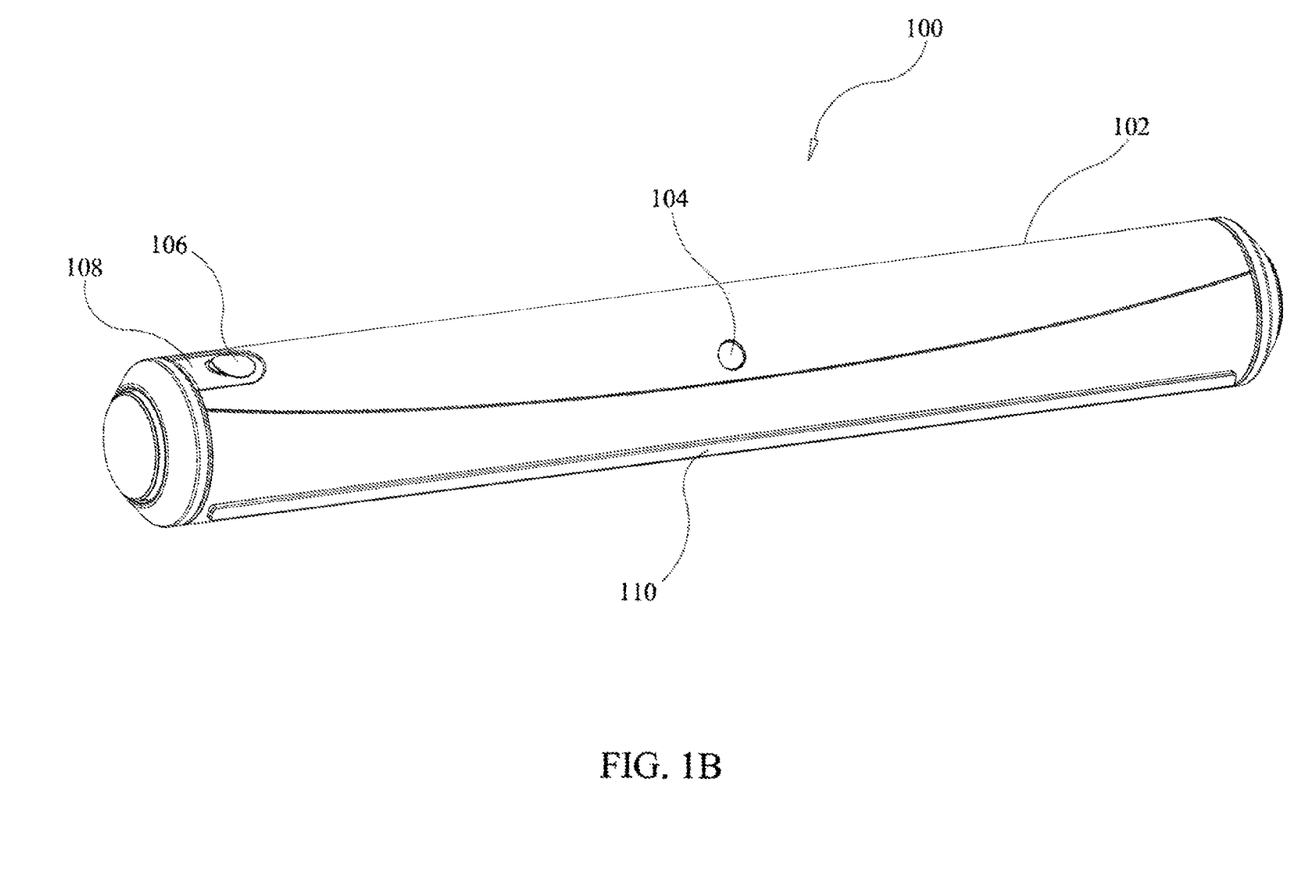

Referring now to FIGS. 1A & 1B perspective views of hologram generator device 100 according to aspects of embodiments of the present invention are shown. The hologram generator device 100 may, in one aspect of an embodiment of the present invention, have a tubular configuration 102 as shown. However, the configuration of hologram generator device 100 is not limited to this configuration and other configurations are possible. Hologram generator device 100 may include one or more projector(s) 104 through which holograms may be projected. Projector(s) 104 may, in one aspect of an embodiment of the present invention, also be configured to function as a camera and/or camera optical relay. Hologram generator device 100 may also include a release button 106 which may be used to activate a release & return mechanism 108 for unfurling and retracting a retractable screen 110. In one aspect of an embodiment of the present invention, retractable screen 110 may be flexible and/or constructed of flexible materials that are known and used in the art for electronic screen displays, such that retractable screen 110 may be scrolled into hologram generator device 100 for maximum portability. Hologram generator device 100 may further include an operating system 112 (not shown) which may further include a processor 114 (not shown) and memory 116 (not shown) and, in another aspect, additional modules or components as necessary. In one aspect of an embodiment of the present invention, processor 114 may, in one aspect of an embodiment of the present invention, be disposed in communication with memory 116. Processor 114 may be any type of processor, such as, but not limited to, a central processing unit (CPU), a microprocessor, a video processor, a front end processor, a coprocessor, a single-core central processor, a multi-core processor, or a combination thereof and the like.

In one aspect of an embodiment of the present invention, embedded within processor 114 are computer executable instructions or code 118 (not shown) which are readable and executable by processor 114. In another aspect, these computer executable instructions may be stored in memory 116. Computer executable instructions 118 may be in the form of a computer program, the program being composed in any suitable programming language or source code, such as C++, C, JAVA, JavaScript, HTML, XML, and other programming languages. Computer executable instructions 118 may be configured for performing any and all the necessary functions for hologram generator device 100 and operations disclosed herein.

Figure 2A:
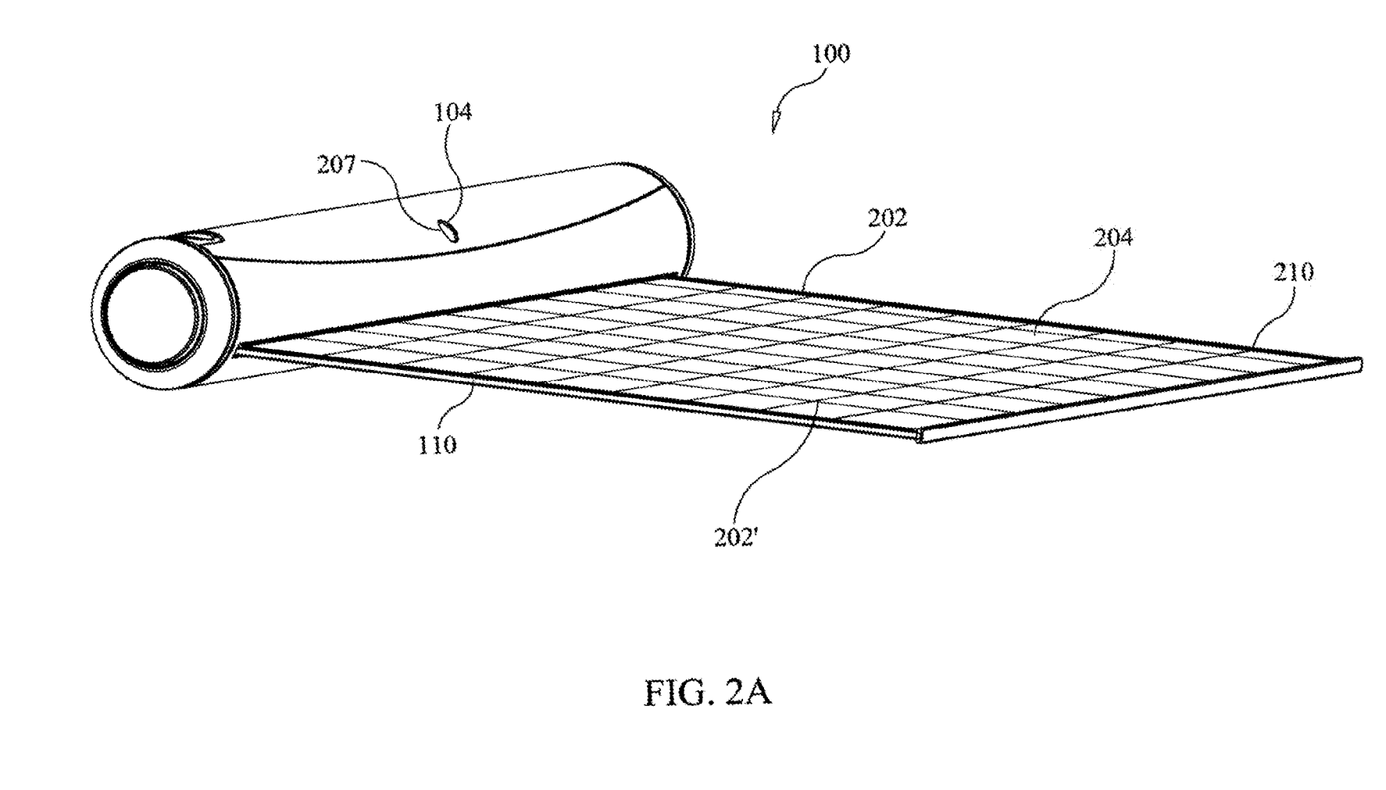
FIGS. 2A & 2B show perspective views of the hologram generator device with a drawn out screen according to additional aspects of embodiments of the present invention.
Figure 2B:
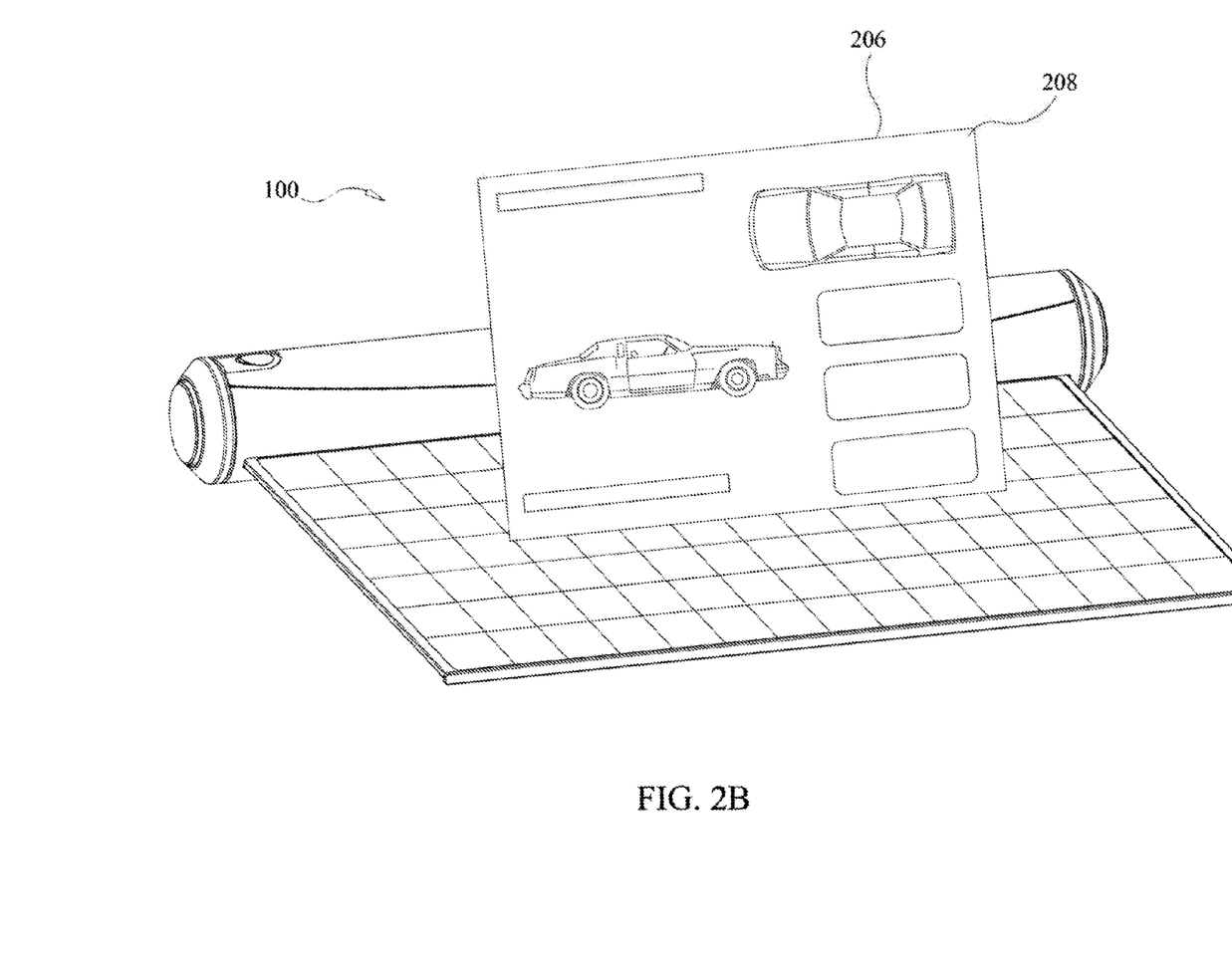

Referring now to FIGS. 2A & 2B perspective views of hologram generator device 100 with retractable screen 110 according to additional aspects of embodiments of the present invention are shown. Hologram generator device 100 is shown with retractable screen 110 drawn out (or, alternatively, mechanically extended by way of release and return mechanism 108 having been activated by release button 106). Retractable screen 110 is shown having one or more image(s) or video 202, tile display 204 and one or more hologram(s) 206 having been projected by way of projector(s) 104. In one aspect of an embodiment of the present invention, image(s) 202 may be real time.

As shown, hologram generator device 100 may, in one aspect of an embodiment of the present invention, be constructed of a lightweight, hard, durable material, e.g. a plastics commonly used for PVC piping, and more particularly, capable of resourcefully controlling one or more hologram images 206, video hosting or other multimedia data passing through operating system 112 and releasing (or displaying) the same in real-time when the user operated hologram generator device 100 provides the commands for such display. Processor 114 may be configured to generate at least one or more holograms 206 corresponding to a desired image 202 to be displayed. Holograms 206 may be projected by way of one or more of projector(s) 104. Tile display 204 may be readily extendable by depressing release button 106 connected to release and retain mechanism 108 housed within hologram generator device 100, which allows for the release of tile display 204 once the release button 106 is activated.

In aspects of embodiments of the present invention, hologram generator device 100 may be enabled for the transformation of hologram(s) or holographic image(s) 206 and/or the content of hologram(s) or holographic image(s) 206 and the real time manifestation of hologram(s) or holographic image(s) 206 in conjunction with projector(s) 104 and projector(s) 104's optical projection of hologram(s) or holographic image(s) 206.

Hologram generator device 100, in one aspect of an embodiment of the present invention, may provide for the hosting and display of already made hologram images or videos 206 and an apparatus 102 for transferring or displaying the same, which may be displayed by any means such as a head-up display or mounted on an sports helmet serving as a sportsman visor, SWAT team head cover, soldiers or special team forces' gears at the theater, but not exclusively for the above mentioned devices or platforms.

As shown, stored or real time image 202 may be hosted by operating system 112 and the image size may be determined by the required level of distribution that is associated with the image size. The level of distribution size is normally chosen automatically by operating system 112 so as to ensure that the information contained in hologram(s) or holographic image(s) 206 is evenly spread across the dimensions of the hologram display. Hologram(s) or holographic image(s) 206 may be computed from the defined setting according operating system 112's capabilities. Operating system 112 may also have ability or be enabled to set out several final holograms objects in each tile 210 displayed and only enacted fully into operation after touch by the users. In one aspect of an embodiment of the present invention, operating system 112 may be optimized for 3-Dimensional and/or augmented reality technology and displays. In another aspect of an embodiment of the present invention, operating system 112 may be based on one or more open source platform(s). Operating system 112 must, in another aspect, have the minimal capability of running multiple instances of server platform(s) (e.g. Node.js) that may be used for real time communication between hologram generator device 100 and other devices. Operating system 112, in one aspect of an embodiment of the present invention, must be enabled to run multiple instances of these server platform(s) and managing the depth software associated with projector(s) 104 simultaneously. In yet another aspect of an embodiment of the present invention, elements of hologram generator device 100 may be controlled, operated by, and/or disposed in communication with operating system 112.

The set of final holograms may be outputted from operating system 112 which then transfers it onto the tile like imagery display for final display. Accordingly, the present invention may also relate to a real time display of a recorded or real time video, text, object image by means of holographic formations. Various means are proposed for the transformation of the hologram content, the real time manifestation of the holograms through projector(s) or device camera 104 and the optical projection of hologram(s) 206. Hologram generator device 100 may be enabled to facilitate real time, portable, easy access for low and high tech users of hologram(s) 206.

It will be understood that it is possible to provide more than one tile of hologram touch frame for image 202 and to operate on each tile frame of hologram(s) 206 in the manner described with reference to FIGS. 1A-2B, to provide final hologram(s) 206 for projection of desired image 202 at an image plane.

In one aspect of an embodiment of the present invention, as hologram(s) or holographic image(s) 206 is being projected, additional hologram(s), objects and/or videos (data) may arrive at operating system 112, which then will process the data by pausing the new arrivals or incoming data while enabling the current projected content for the hologram(s) or holographic image(s) being displayed to be completed. Operating system 112 may, in one aspect of an embodiment of the present invention, send a signal out to the frame of the newly arrived hologram by alerting the user of its arrival by blinking with a setting color that the user may've already preset, indicating there is a message, video, image or new hologram and the like, waiting to be viewed. In another aspect, hologram generator device 100 may have sizeable memory within the device that can enable storage while an image or object is being displayed.

In one aspect of an embodiment of the present invention, hologram generator device 100 may be enabled by 3-D holographic imaging technology thereby enabling projector(s) 104 to project a 3-D image in real time. Projector(s) 104 may, in another aspect of an embodiment of the present invention, include depth sensors which are enabled to detect hand interactivity with hologram(s) or holographic image(s) 206. In one aspect of an embodiment of the present invention, hologram generator device 100 may use depth-sensing technology to detect a user's hands in real-world space. Operating system 112 may, in one aspect of an embodiment of the present invention, use gesture recognition software to process hand states and position. Interactive logic may also be applied to the processed data and the 3-D scene or image responds accordingly.

Projector(s) 104 may also, in another aspect, include visual trackers 207 (which, in one aspect may include one or more lasers) which may be used to accurately track the hands of a user and the interaction with hologram(s) or holographic image(s) 206. These aspects of projector(s) 104 enable a user to control hologram(s) or holographic image(s) 206 and the content projected within hologram(s) or holographic image(s) 206.

In one aspect of an embodiment of the present invention, the 3-D image projected by projector(s) 104 may be viewed by way of 3-D glasses. In another aspect, hologram generator device 100 may be configured to feed real time content and may be compatible with secondary enabled devices, including, without limitation, mobile phones, active and/or passive 3-D glasses etc. These enabled devices may be able to communicate with hologram generator device 100 in a number of ways, including, without limitation, hardwire connection and/or wireless connection. For wider compatibility, hologram generator device 100 may include USB/serial port(s) and Wi-Fi radio to this end. Compatible enabled devices may also have standard communication protocol libraries. In another aspect of an embodiment of the present invention, hologram generator device 100 may be controlled by way of one or more of the enabled devices.

Hologram(s) or holographic image(s) 206 may be seen with smart mobile and optical devices which have the capability to render 3-D objects in real-time over a live camera feed. Hologram generator device 100 may, in yet another aspect of an embodiment of the present invention, be enabled to project content communicated through one or more enabled devices.

Methods

Figure 3:
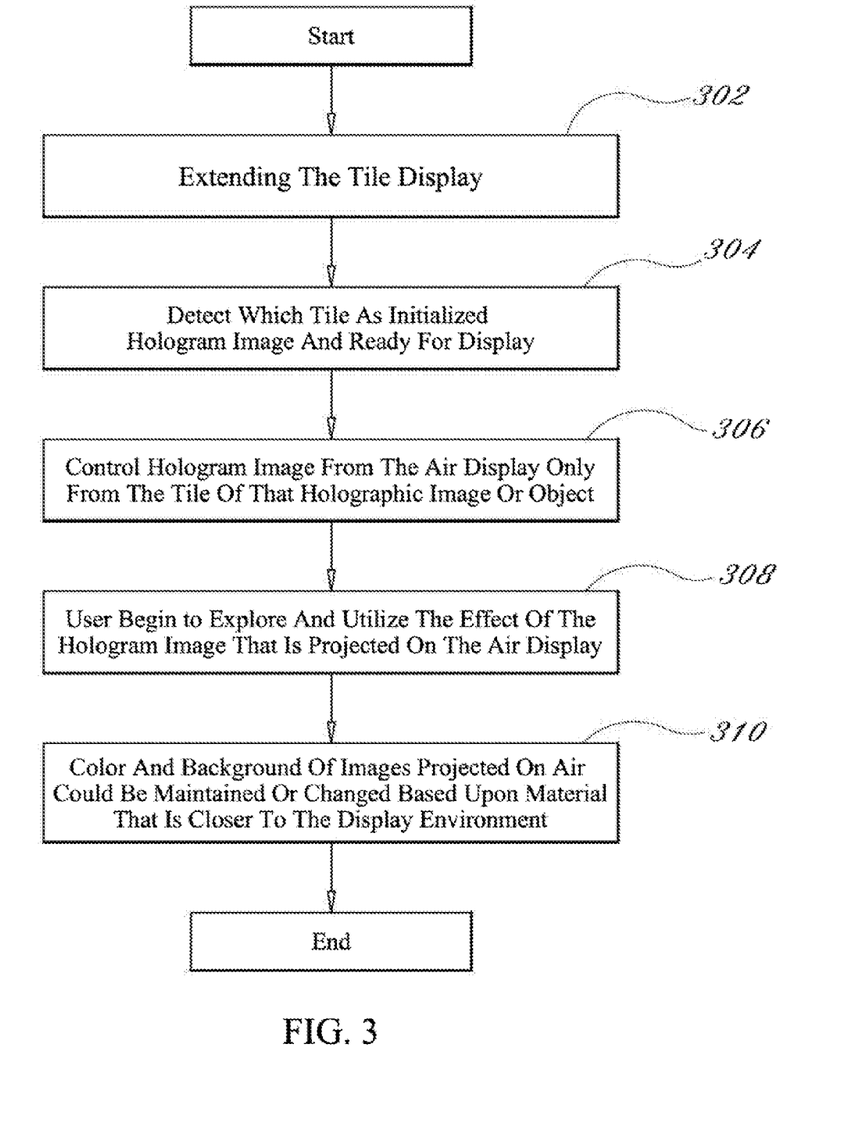
FIG. 3 shows a process flow chart according to an aspect of an embodiment of the present invention.

Referring now to FIG. 3, a process or flow or method 300 according to an aspect of an embodiment of the present invention is shown. Process 300 begins with hologram generator device 100 receiving a release command for extending the tile display 110 in step 302 from which any one or more of holographic image(s), video and/or multimedia data 202, may be selected in step 304 for display (or projection). Hologram generator device 100 may include one or more sensors 120 (not shown) for detecting which tile 210 as initialized hologram image 202 is ready for display (step 304). In one aspect of an embodiment of the present invention, hologram generator device 100 may then receive and process data or information necessary for the display of the hologram image(s) after which it is displayed, which may or may not be in real-time. In one aspect, a 3-D hologram(s) or holographic image(s) 206 may be projected. Process 300 then proceeds to step 306 where hologram image 206 may then be controlled from air display 208. In one aspect, this control may be from only air display. In another aspect, the control may be made possible from tile 210 of the holographic image or object. Next, in step 308, the user may then begin to explore and manipulate projected image or hologram(s) or holographic image(s) 206 as projected on air display 208. In one aspect, the user may be able to manipulate content within the hologram(s) or holographic image(s) 206. In another aspect, the sensed hand interactions with the hologram(s) or holographic image(s) 206 may be coordinated to have the effects reflected in the hologram(s) or holographic image(s) 206. This may be made possible by the tracking of the user's hand motions by visual tracker(s) 207 of projector(s) 104.

Next, in step 310 the color and background of projected image(s) or hologram(s) 206 projected on air display 208 may be maintained or changed based on material that is closer to the display environment. Content being displayed may have the ability of being tinted with a color. That tint color can be determined based on the color(s) of other materials within a close proximity to hologram generating device 100.

Figure 4:
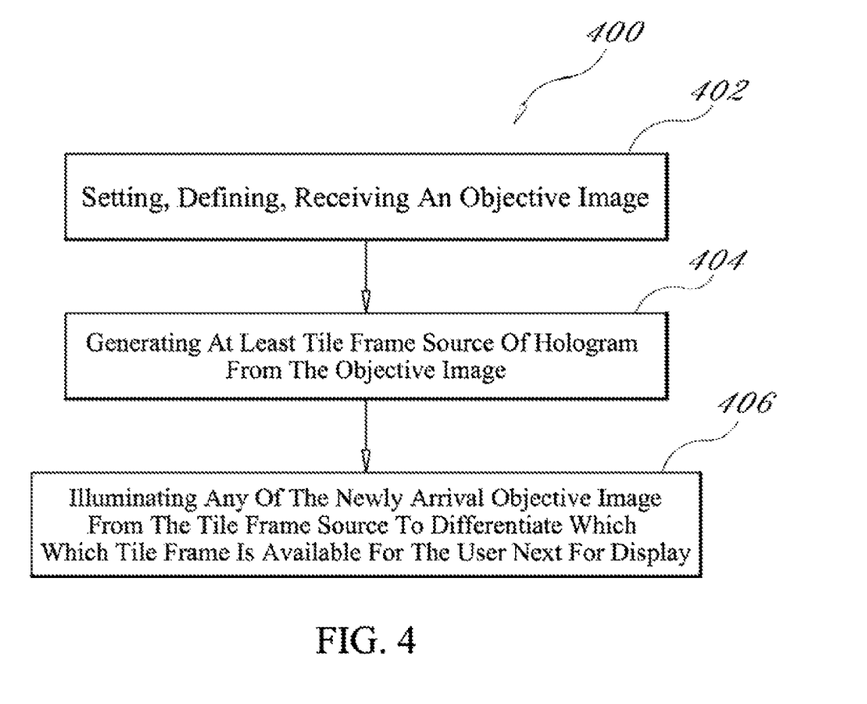
FIG. 4 shows another process flow chart according to an aspect of an embodiment of the present invention.

Referring now to FIG. 4, another process flow chart according to an aspect of an embodiment of the present invention is shown. Process 400 begins with the steps of setting, defining, and receiving of an objective image in step 402. Next, in step 404 the tile frame source of hologram is generated from the objective image. Any of the newly arrived/received image(s) from the tile frame source are then illuminated in step 406 to differentiate which tile frame is available for the user next for display.

In one aspect of an embodiment of the present invention, process 400 may further include the steps of matching operating system 112's setting operations to generate at least one or more final holograms associated with the hosted operating system to prepare the final holograms for display. This step, in turn, may include the step of selecting each tile frame operating from at least one of the following: a text display, social media sites, health video, advertising, movies and the like. Each transformation is selected from at least one of the following: flipping the image display, rotating, squeezing to delete, and transfer or place to another tile frame. Process 400, in another aspect of an embodiment of the present invention, may further include the step of generating videos from a plurality of tiles or frames where each tile frame is comprised of resultant images. Process 400 may also include the step of displaying at least one or more holograms for each tile frame of the video.

Hardware and Operating Environment

This section provides an overview of example hardware and the operating environments in conjunction with which embodiments of the inventive subject matter may be implemented.

Figure 5:
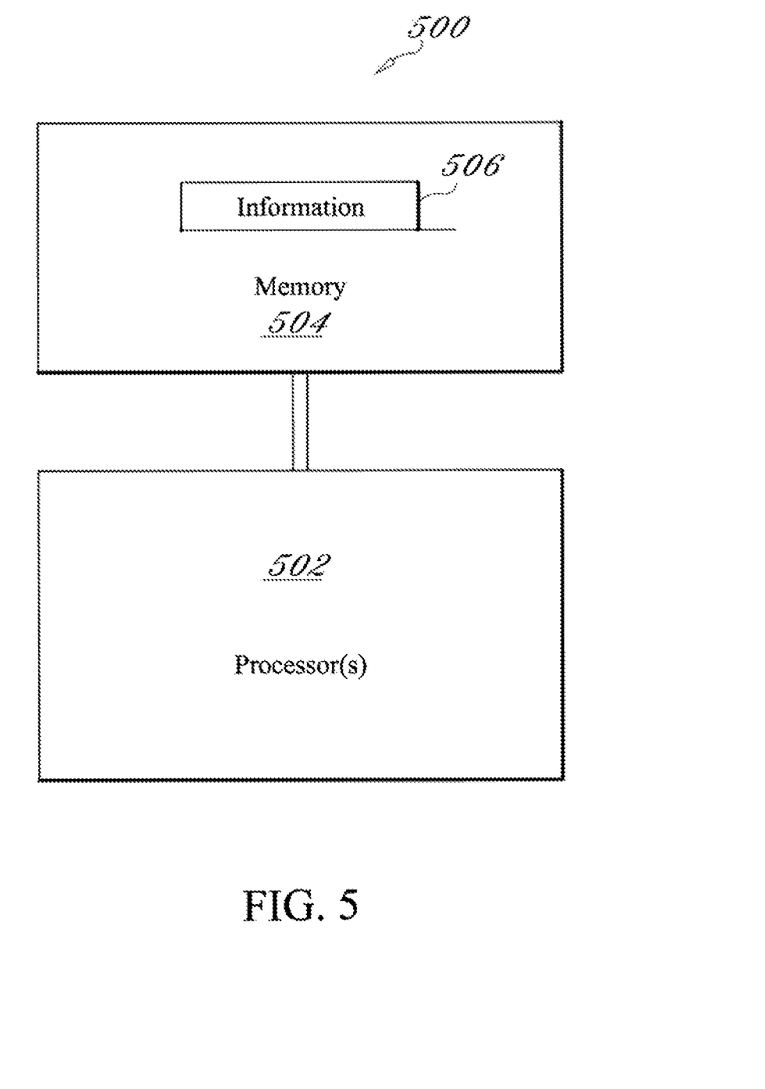
FIG. 5 shows a block diagram according to an aspect of an embodiment of the present invention.

Referring now to FIG. 5, a block diagram according to an aspect of an embodiment of the present invention is shown. In one aspect of an embodiment of the present invention, a software program may be launched from a computer readable medium in a computer-based system 500 to execute the functions defined in the software program. Various programming languages may be employed to create software programs designed to implement and perform the operations disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 5 below.

Apparatus 500, as shown in FIG. 5 may include, in one aspect of an embodiment of the present invention, a computer, a memory system, a magnetic or optical disk, some other storage device, or any type of electronic device or system. Apparatus 500 may include one or more processor(s) 502 disposed in communication with a machine-accessible medium such as memory 504 (e.g., a memory including electrical, optical, or electromagnetic elements). Memory 504 may contain associated information 506 (e.g., computer program instruction code, data, or both) which, when accessed, results in a machine (e.g., the processor(s) 504) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. An apparatus for displaying a holographic image, comprising:
    at least one projector disposed within said apparatus, wherein said at least one projector is configured to project at least one holographic image and is enabled to emit a thin sheet of air with reflective particles for display of said at least one holographic image;
    a flexible screen disposed within said apparatus;
    a processor disposed within said apparatus, wherein said processor is in communication with memory, wherein said memory is also disposed within said apparatus and wherein said processor is configured to process said at least one holographic image;
    at least one depth sensor disposed within said apparatus and in communication with said processor, wherein said at least one depth sensor is configured to detect a user's hands and gestures;
    a release button located on said apparatus; and
    a release and retract mechanism, disposed within said apparatus and in communication with said release button, wherein said mechanism releases and retracts said flexible screen upon activation of said release button.

2. The apparatus according to claim 1, wherein said apparatus is enabled to communicate with a secondary device.

3. The apparatus according to claim 1, wherein said apparatus is remotely controlled.

4. The apparatus according to claim 1, further comprising at least one visual tracker disposed in communication with said processor.

5. The apparatus according to claim 4, wherein said at least one visual tracker is configured to observe said at least one holographic image.

6. The apparatus of claim 4, wherein said at least one visual tracker comprises of at least one laser.

7. The apparatus according to claim 4, wherein said processor is enabled to process data from said at least one tracker and reflect said data in the display of said at least one holographic image.

8. The apparatus according to claim 4, wherein said at least one visual tracker is configured to detect manipulation of content within said at least one holographic image.

9. The apparatus according to claim 4, wherein said at least one laser is configured to track said user's hands.

10. The apparatus according to claim 1, wherein said processor and said at least one depth sensor collaborate to reflect manipulations and interactions made to said holographic image by said user.

11. The apparatus according to claim 1, wherein said processor and said at least one visual tracker collaborate to reflect manipulations and interactions made to said at least one holographic image by said user.

12. A computer program product comprising a non-transitory computer readable medium having control logic stored therein for causing a processor to enable the display of at least one holographic image, said control logic comprising:
    computer readable code for determining which said at least one holographic image to project;
    computer readable code for receiving information required for generation of said at least one holographic image;
    computer readable code for processing information required for generation of said at least one holographic image;
    computer readable code for enabling projection of said at least one holographic image; and
    computer readable code for enabling manipulation of said at least one holographic image.

13. The computer program product of claim 12, further comprising computer readable code for enabling manipulation of content within said at least one holographic image.

14. The computer program product of claim 12, further comprising computer readable code for enabling control of said at least one holographic image from an air display.

15. The computer program product of claim 12, further comprising computer readable code for enabling real-time projection of said at least one holographic image.

16. The computer program product of claim 12, further comprising computer readable code for displaying a 3-dimensional holographic image.

17. The computer program product of claim 12, further comprising computer readable code for coordinating sensed hand interactivity with said at least one holographic image and displaying manipulations of said at least one holographic image as a result of said sensed hand interactivity.

18. The computer program product of claim 12, further comprising computer readable code for enabling tracking hand motion of a user.

19. The computer program product of claim 12, further comprising computer readable code for enabling maintenance of color and background of said at least one holographic image.

20. The computer program product of claim 12, further comprising computer readable code for enabling communication of said processor with at least one secondary device.

21. A method of enabling a processor to display at least one holographic image, said method comprising the steps of:
    determining which said at least one holographic image to project;
    controlling said at least one holographic image from an air display;
    receiving information required for generation of said at least one holographic image;
    processing information required for generation of said at least one holographic image;
    enabling projection of said at least one holographic image; and
    enabling manipulation of said at least one holographic image.

22. The method of claim 21, further comprising the step of enabling manipulation of content within said at least one holographic image.

23. The method of claim 21, further comprising the step of enabling real-time projection of said at least one holographic image.

24. The method of claim 21, further comprising the step of displaying a 3-dimensional holographic image.

25. The method of claim 21, further comprising the step of coordinating sensed hand interactivity with said at least one holographic image and displaying manipulations of said at least one holographic image as a result of said sensed hand interactivity.

26. The method of claim 21, further comprising the step of enabling tracking hand motion of a user.

27. The method of claim 21, further comprising the step of enabling maintenance of color and background of said at least one holographic image.

28. The method of claim 21, further comprising the step of enabling communication of said processor with at least one secondary device.

* * * * *